(12) United States Patent
Saida (10) Patent No.: US 8,655,531 B2
(45) Date of Patent: Feb. 18, 2014

(54) BICYCLE ELECTRICAL COMPONENT CONTROL SYSTEM

(75) Inventor: Takao Saida, Osaka (JP)

(73) Assignee: Shimano Inc., Osaka (JP)

(*) Notice: Subject to any disclaimer, the term of this patent is extended or adjusted under 35 U.S.C. 154(b) by 89 days.

(21) Appl. No.: 13/155,636

(22) Filed: Jun. 8, 2011

(65) Prior Publication Data

US 2012/0316710 A1    Dec. 13, 2012

(30) Foreign Application Priority Data

Jun. 11, 2010    (JP) ................... 2010-134553

(51) Int. Cl.
*G06F 7/00*    (2006.01)

(52) U.S. Cl.
USPC .......................................... 701/22

(58) Field of Classification Search
USPC .................................... 701/22, 36
See application file for complete search history.

(56) References Cited

U.S. PATENT DOCUMENTS

| | | | |
|---|---|---|---|
| 6,015,021 A | 1/2000 | Tanaka et al. | |
| 6,320,336 B1 | 11/2001 | Eguchi | |
| 2005/0246152 A1 | 11/2005 | Kokatsu et al. | |
| 2008/0177433 A1* | 7/2008 | Teo et al. | 701/22 |
| 2011/0267178 A1* | 11/2011 | Nishihara et al. | 340/12.39 |

FOREIGN PATENT DOCUMENTS

| | | | | |
|---|---|---|---|---|
| EP | 1 298 050 | * | 4/2003 | ............ B62M 23/02 |
| EP | 1 298 050 A1 | | 4/2003 | |
| EP | 1 425211 B1 | | 3/2006 | |
| JP | 9-309484 A | | 12/1997 | |
| JP | 2001-122180 A | | 5/2001 | |
| JP | 2001-122181 A | | 5/2001 | |
| JP | 2001-122183 A | | 5/2001 | |
| JP | 3306299 B2 | | 5/2002 | |
| JP | 2002-356192 A | | 12/2002 | |
| JP | 2004-322882 A | | 11/2004 | |
| JP | 2004322882 | * | 11/2004 | ............ B62M 23/02 |
| JP | 2005-41352 A | | 2/2005 | |
| JP | 2005-132274 A | | 5/2005 | |
| JP | 2005-304283 A | | 10/2005 | |

OTHER PUBLICATIONS

European Search Report of corresponding EP Application No. 11 16 6769-7 dated Jul. 5, 2011.

* cited by examiner

*Primary Examiner* — Kim T Nguyen (74) *Attorney, Agent, or Firm* — Global IP Counselors (57) ABSTRACT

An electrical component control system is provided for controlling a plurality of electrical components that can be installed on an electric bicycle in which human-powered driving is assisted by a motor. The bicycle electrical component control system basically includes a control part that sets a current operation mode from at least three operation modes based on an operating state of each of the electrical bicycle components. The control part controls the electrical bicycle components in accordance with the current operation mode that was selected.

10 Claims, 5 Drawing Sheets

| RANK | ELECTRICAL COMPONENT | OPERATION MODE | ASSIST | | | NEUTRAL | REGENERATION | | DYNAMO | POWER |
|---|---|---|---|---|---|---|---|---|---|---|
| | | | FIRST ASSIST | SECOND ASSIST | THIRD ASSIST | | FIRST REGENERATION | SECOND REGENERATION | | |
| | | DEGREE OF PRIORITY | 1 | 2 | 3 | | 1 | 2 | | |
| S | MAIN MOTOR BODY | | ○ | ○ | ○ | ○ | ○ | ○ | × | × |
| | POWER-STORING PART | | ○ | ○ | ○ | ○ | ○ | ○ | ○ | × |
| | TORQUE SENSOR | | ○ | ○ | ○ | △ | △ | △ | × | × |
| | ROTATION SENSOR | | △ | ○ | △ | △ | ○ | △ | × | × |
| | POWER SWITCH | | ○ | ○ | ○ | ○ | ○ | ○ | △ | × |
| | BRAKE SENSOR | | ○ | ○ | ○ | △ | △ | △ | × | × |
| A | FORWARD-ILLUMINATING LIGHT | | △ | △ | △ | △ | △ | △ | △ | × |
| B | DISPLAY DEVICE | | △ | △ | △ | △ | △ | △ | △ | × |
| C | SHIFT SWITCH | | △ | × | × | △ | △ | △ | × | × |
| | REAR DERAILLEUR | | ○ | × | × | △ | △ | △ | × | × |
| NOTE | ○: OPERATION REQUIRED   △: OPERATION POSSIBLE   X: NON PERATIONAL | | | | | | | | | |

BICYCLE ELECTRICAL COMPONENT CONTROL SYSTEM

CROSS-REFERENCE TO RELATED APPLICATIONS

This application claims priority under 35 U.S.C. §119 to Japanese Patent Application No. 2010-134553, filed Jun. 11, 2010. The entire disclosure of Japanese Patent Application No. 2010-134553 is hereby incorporated herein by reference.

BACKGROUND OF THE INVENTION

1. Field of the Invention

The present invention relates to a bicycle electrical component control system, and in particular to a bicycle electrical component control system for controlling a plurality of electrical components that can be installed on an electric bicycle in which human-powered driving is assisted by a motor.

2. Background Information

There are known in the art power-assisted bicycles, in which human-powered driving of a bicycle is assisted by an electric motor (for example, see JP-A 2005-304283). In a conventional power-assisted bicycle of such description, when the rider selects the assist mode, the driving force applied by the rider is assisted by an electric motor. In contrast, when the rider selects the regenerative charging mode, electrical power obtained from the electric motor is fed to a battery, whereby the battery is regeneratively charged.

SUMMARY

In a conventional power-assisted bicycle, operation of all electrical components is often stopped in a circumstance in which, e.g., the charge amount in the battery becomes insufficient and the main power supply switches off, or some of the electrical bicycle components stop operating normally. If operation of all electrical components is stopped merely because some of the electrical bicycle components are not operating normally, there is a possibility of not being able to take any advantage of the merits of power-assisted bicycles. Also, in a circumstance in which some of the electrical bicycle components stop operating normally, if all electrical components, including the electrical bicycle components that are not operating normally, are allowed to continue to operate, there is a possibility of a fault occurring in electrical components that are operating normally.

One object of the present disclosure is to provide a bicycle electrical component control system that is capable of controlling the electrical bicycle components in an appropriate manner according to the state of operation of the electrical bicycle components.

In accordance with a first aspect of the present disclosure, a bicycle electrical component control system is provided for controlling a plurality of electrical components that can be installed on an electric bicycle in which human-powered driving is assisted by a motor.

In accordance with a first aspect of the present disclosure, a bicycle electrical component control system is proposed for controlling a plurality of electrical components that can be installed on an electric bicycle in which human-powered driving is assisted by a motor. The bicycle electrical component control system basically comprises a control part that sets a current operation mode from at least three operation modes based on an operating state of each of the electrical bicycle components. The control part controls the electrical bicycle components in accordance with the current operation mode that was selected.

In bicycle electrical component control system of this first aspect, the control part selects an operation mode from three or more operation modes based on a state of operation of a plurality of electrical components. For example, in a case in which an electric bicycle operates in the first operation mode, the second operation mode and the third operation mode, if the electric bicycle is operating in the first operation mode, the control part selects the second operation mode or the third operation mode as the operation mode of the electric bicycle based on the state of operation of the electrical bicycle components. Similarly, if the electric bicycle is operating in the second operation mode or the third operation mode, the control part selects an operation mode other than the operation mode in operation as the operation mode of the electric bicycle based on the state of operation of the electrical bicycle components. The operation mode selected by the control part is an operation mode that corresponds with the state of operation of the electrical bicycle components.

Thus, in such a case, an operation mode that corresponds with the state of operation of the electrical bicycle components is selected from three or more operation modes based on the state of operation of the electrical bicycle components. Causing the electric bicycle to operate in the selected operation mode makes it possible to control the electrical bicycle components in an appropriate manner according to the state of operation of the electrical bicycle components.

In accordance with a second aspect of the present disclosure, the bicycle electrical component control system of the first aspect is further provided with a communication part that perform communication with each of the electrical bicycle components. Here, the control part determines the operating states of the electrical bicycle components being in one of an active operating state and an inactive operating state based on a result of communication by the communication part. In this case, the communication part performs communication with each of the electrical bicycle components, and the control part determines the state of operation of each of the electrical bicycle components according to the result of the communication. For example, the control part determines the state of operation of an electrical component from a presence or absence of communication between the communication part and the electrical component. The state of operation of the electrical component can thereby be determined in an appropriate manner.

In accordance with a third aspect of the present disclosure, the bicycle electrical component control system of the first or second aspect is further configured such that the control part performs a comparison between a plurality of preset operating configurations of the electrical bicycle components in each of the at least three operation modes and the operating states of the electrical bicycle components being in one of an active operating state and an inactive operating state, and the control part further selects the current operation mode from the at least three operation modes that operates based on which one of the preset operating configurations of the electrical bicycle components most closely matches the operating states of the electrical bicycle components. In such a circumstance, the control part performs a comparison between the state of operation of a plurality of electrical components, and a preset operating configuration of the electrical bicycle components that operate in each of three or more operation modes, i.e., a preset operating configuration of electrical components for defining electrical components that are required to operate in each of the operation modes. The control part selects an operation mode that operates according to the configuration of operation that corresponds with the state of operation of the electrical bicycle components. The appropriate operation mode can thereby be selected based on the state of operation of the electrical bicycle components.

In accordance with a fourth aspect of the present disclosure, the bicycle electrical component control system of the third aspect is further configured such that the preset operating configurations of the electrical bicycle components is set according to a degree of importance of each of the electrical bicycle components in each of the at least three operation modes. In such a circumstance, the configuration of operation of an electrical component is set according to the degree of importance of the electrical component in each of the operation modes, i.e., the degree of importance of the electrical component required to operate in each of the operation modes. It is accordingly possible to perform a control so that an electrical component with a higher degree of electrical component importance operates in the respective operation mode.

In accordance with a fifth aspect of the present disclosure, the bicycle electrical component control system of any of the first through fourth aspects is further configured such that the at least three operation modes include a plurality of assist modes between which operation of the motor for assisting human-powered driving differs. In such a circumstance, three or more operation modes include a plurality of assist modes between which operation of the motor for assisting human-powered driving differs, therefore making it possible to control the electrical component in an appropriate manner according to the state of operation of the electrical component, even in a circumstance in which the electric bicycle operates in a variety of assist modes.

In accordance with a sixth aspect of the present disclosure, the bicycle electrical component control system of any of the first through fifth aspects is further configured such that the control part switches and selects the current operation mode based on a predetermined sequence. In such a circumstance, the control part switches and selects the operation mode based on a predetermined sequence for switching the operation mode to each of the operation modes. For example, a switching path for switching the operation mode from one operation mode to another operation mode is set based on a predetermined sequence, therefore making it possible to switch the operation mode in a smooth and appropriate manner. This setting also makes it possible to eliminate unnecessary control, making it possible to reduce the load on the control part during processing.

Accordingly, an operation mode that corresponds with the state of operation of the electrical bicycle components is selected from three or more operation modes based on the state of operation of a plurality of electrical components.

Various objects, features, aspects and advantages of the bicycle electrical component control system will become apparent to those skilled in the art from the following detailed description, which, taken in conjunction with the annexed drawings, discloses one illustrative embodiment of a bicycle electrical component control system.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
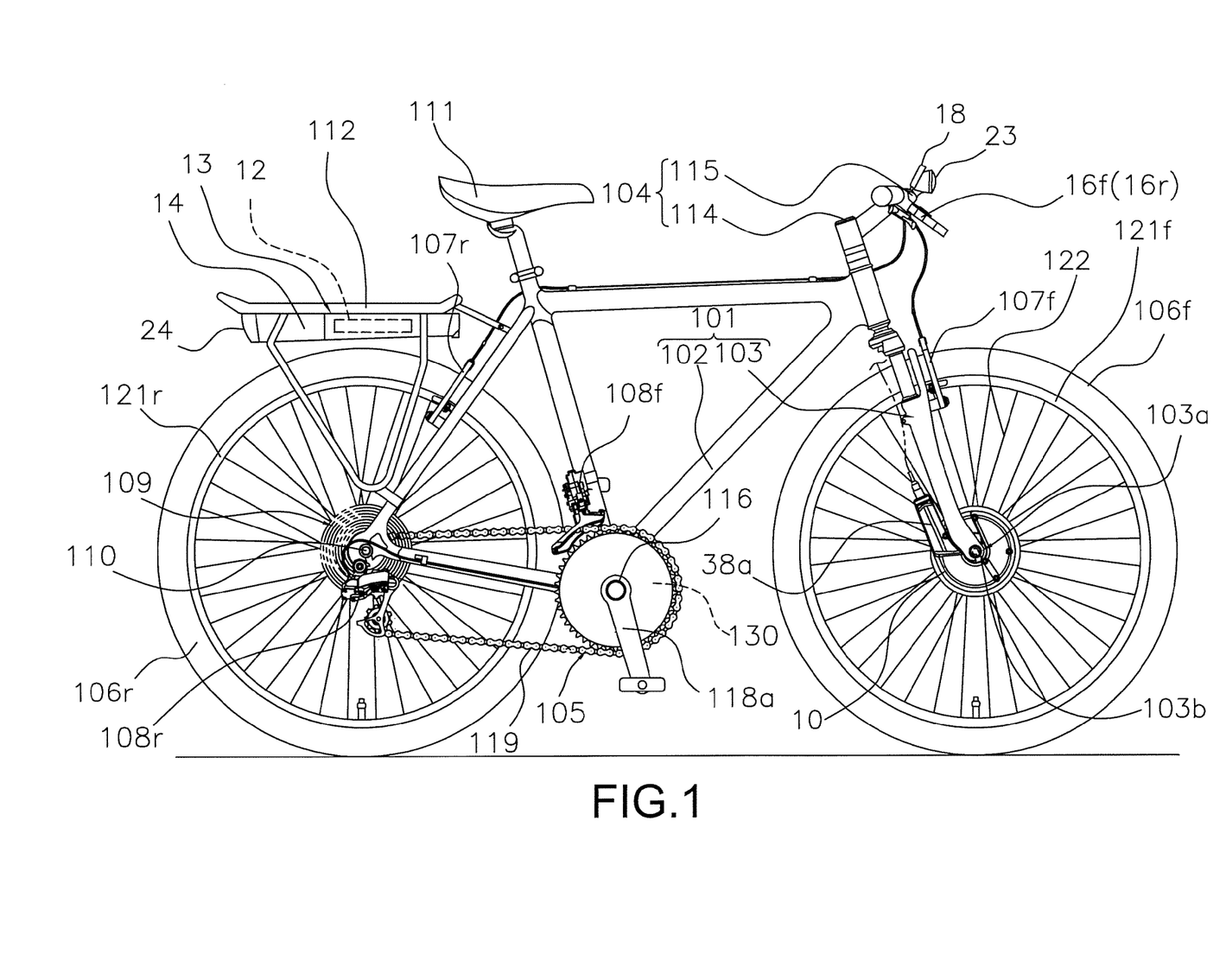
FIG. 1 is a right side elevational view of a bicycle that is equipped with a bicycle electrical component control system in accordance with one embodiment.

As shown in FIG. 1, a bicycle is illustrated which is equipped with a power-assisted bicycle in which human-powered driving is assisted by a motor-integrated hub or motor unit 10 in accordance with one illustrated embodiment. In the following description, the terms "left" and "right" of the bicycle are defined so that when the bicycle is viewed from the rear, the rightward direction is defined as the right, and the leftward direction is defined as the left.

The bicycle includes a frame 101 having a frame body 102 and a front fork 103 with a handle part 104. The bicycle further includes a drive part 105, a front wheel 106f, a rear wheel 106r, a front braking device 107f, a rear braking device 107r, a headlamp 23 and a tail light 24. The front fork 103 is mounted to a front part of the frame body 102 so as to pivot around an inclined axis. The front brake device 107f performs braking by coming into contact with and applying a braking force to a front rim 121f of the front wheel 106f. The rear brake device 107r performs braking by coming into contact with and applying a braking force to a rear rim 121r of the rear wheel 106r.

A variety of parts including a saddle 111 and the handle part 104 are attached to the frame 101. The drive part 105 includes a front derailleur 108f, a rear derailleur 108r and a gear set 109 mounted on a rear hub 110 of the rear wheel 106r. The drive part 105 also includes a crank shaft 116 supported by a hanger part of the frame body 102 in a rotatable manner. The drive part 105 further includes a gear crank 118a and a left crank (not shown) that are secured to both ends of the crank shaft 116. The drive part 105 has a chain 119 provided around the gear crank 118a and the gear set 109.

Figure 2:
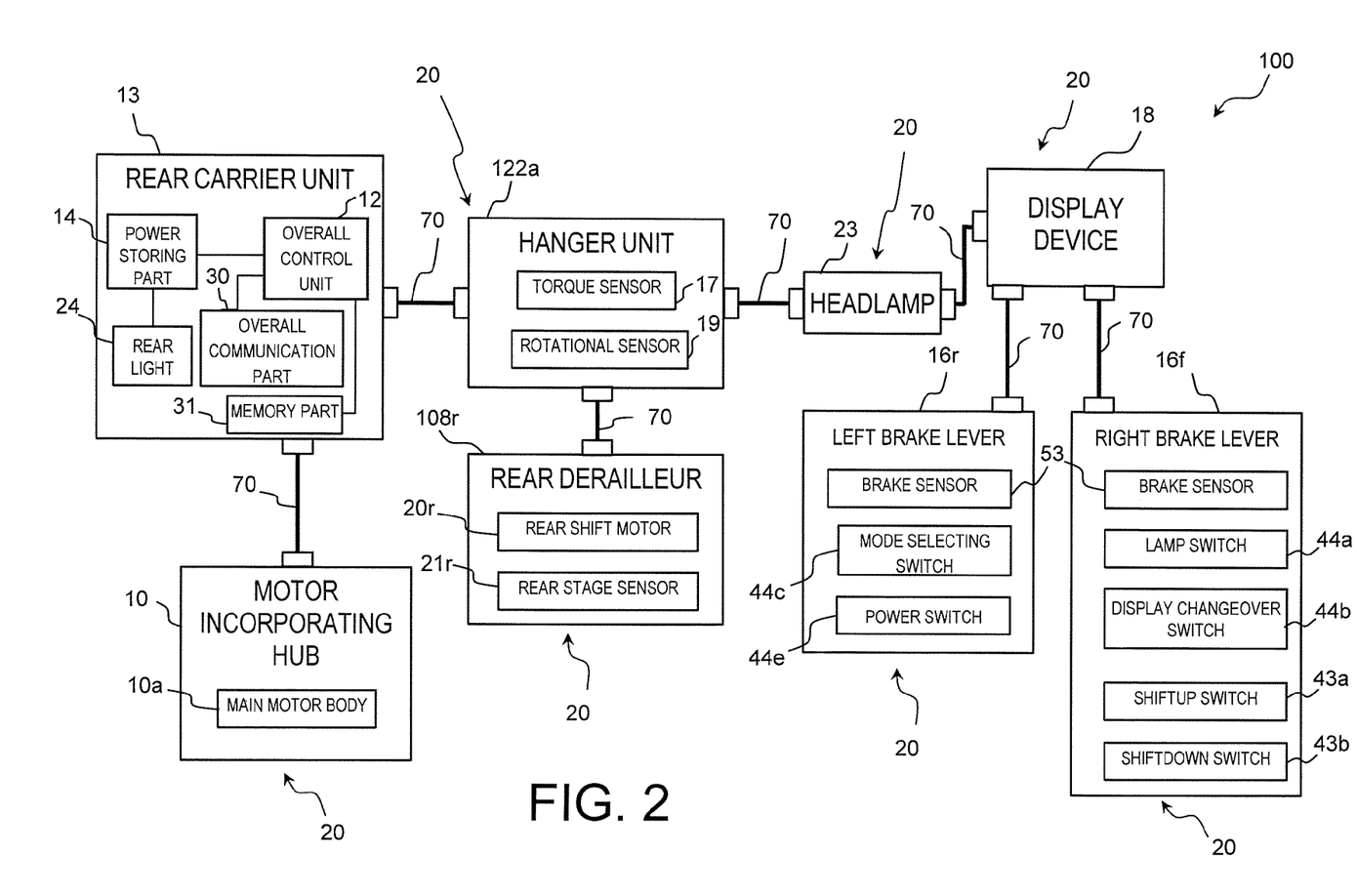
FIG. 2 is a block diagram showing a configuration of electrical components.

In the front derailleur 108f, the chain 119 is engaged around one of, e.g., three sprockets mounted on the gear crank 118a. In the rear derailleur 108r, the chain 119 is engaged around one of e.g., nine sprockets of the gear set 109 attached to the rear hub 110. The front derailleur 108f and the rear derailleur 108r are both electrically driven. The rear derailleur 108r has an electric shift motor or actuator 20r and a stage sensor 21r for detecting a current shift stage as shown in FIG. 2. The front derailleur 108f also has an electric shift motor or actuator (not shown), a stage sensor detecting a current shift stage, and a derailleur control portion that controls the electric actuator and the stage sensor. A shift switch that instructs gear shifting is provided on the handlebar 115. The derailleur control portion controls the electric actuator in response to an operation of the shift switch.

A rear carrier 112 is attached to an upper rear part of the frame body 102. A rear carrier unit 13 is mounted on the rear carrier 112. The rear carrier unit 13 includes an overall control part 12 and an overall communication part 30. The overall control part 12 is configured for controlling electrical components 20 of the entire bicycle. A memory part 31 is mounted on the rear carrier unit 13.

Figure 3:
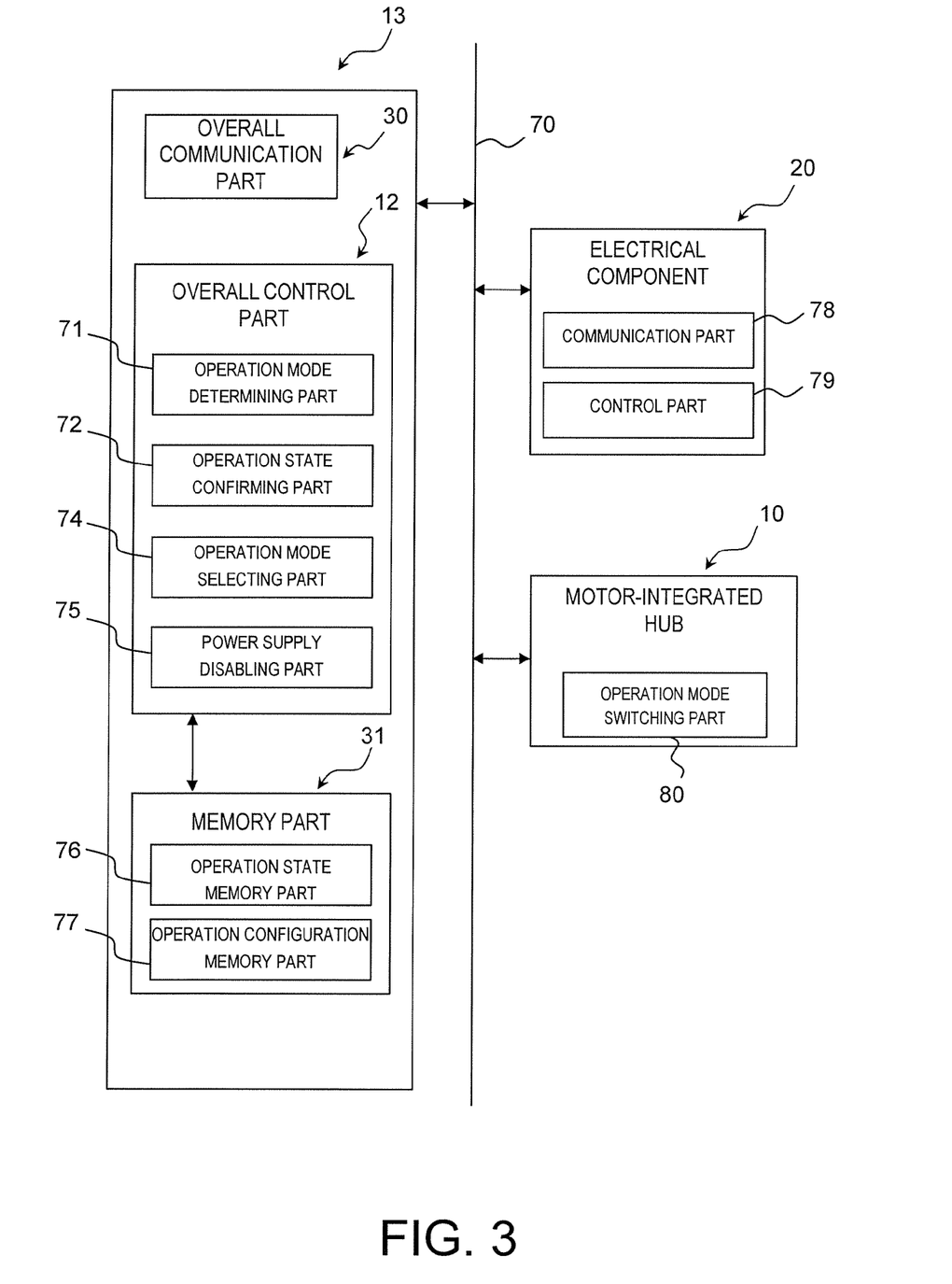
FIG. 3 is a function block diagram of an electrical component control system.

The rear carrier unit 13 is detachably installed with a power-storing part 14, which functions as a power supply for the motor-integrated hub 10, the overall control part 12, the headlamp 23, and other electrical components 20 (see FIG. 3). The power-storing part 14 includes a storage battery. The storage battery includes, e.g., a nickel-hydrogen battery, a lithium ion battery, or another battery. The tail light 24 is integrally attached to the power-storing part 14.

The overall control part 12 is actuated using electrical power charged in the power-storing part 14. The overall control part 12 is a controller that includes a CPU (i.e., central processing unit; not shown). For example, the CPU reads a command relating to control from a ROM (i.e., read only memory) and issues the command externally. The CPU also reads a command relating to calculation from the ROM and issues the command externally. In such a circumstance, based on the command from the CPU, a variety of data is read from the ROM and stored in a RAM (random access memory). The CPU then uses the data stored in the RAM to perform a variety of processes. The CPU then issues a variety of commands externally according to the results of the processes.

The overall communication part 30 controls communication with the electrical bicycle components 20, based on a command from the overall control part 12. For example, when a command for transmission of a signal is issued by the overall control part 12, the overall communication part 30 transmits a signal, based on this command, to a communication part 78 (described below) for an electrical component. The overall communication part 30 also receives a signal from the communication part 78 for the electrical component (see FIG. 3).

The memory part 31 stores a variety of data. The memory part 31 is configured so as to include a ROM (i.e., read-only memory) and a RAM (random access memory). Stored in the ROM is a basic program, basic data, basic parameters, and other data that have been defined in advance. Temporarily stored in the RAM are a variety of programs, a variety of data, data during processing, communication data, and other data.

The output of the power-storing part 14 varies according to the state of power storage. For example, the power-storing part 14 outputs the maximum voltage when in a fully charged state. The output voltage decreases from the maximum voltage to the minimum voltage as the charge amount in the power-storing part 14 decreases. For example, as the charge amount in the power-storing part 14 decreases, the output voltage decreases from 24 V (i.e., maximum voltage) to 18 V (i.e., minimum voltage). When power stored in the power-storing part 14 has been depleted or the amount of power stored falls to a predetermined level or below, output from the power-storing part 14 is stopped. Here, the power-storing part 14 is connected to the overall control part 12, and supply of electrical power from the power-storing part 14 is controlled by the overall control part 12.

The motor-integrated hub 10 forms a hub of the front wheel 106f of the bicycle. The motor-integrated hub 10 is mounted at a distal end of the front fork 103 and is for assisting human power. The motor-integrated hub 10 includes a main motor body (see FIG. 2) mounted to an interior of a motor case. The main motor body 10a includes, e.g., a brushless DC motor. The main motor body has a rotor that is rotatably supported by a hub axle; a stator that is secured, on an outer periphery side of the rotor in the radial direction, to an inner peripheral surface of the motor case; and a rotation transmission mechanism for transmitting the rotation of the rotor to the motor case. A spoke is connected to the motor case. The mechanical configuration of the main motor body is not limited to the configuration described above. Although the configuration described above is one for an inner rotor motor, an outer rotor motor may also be used. The rotation transmission mechanism may also have a configuration in which a planetary gear mechanism is not used, and in which the rotor is directly connected to the hub shell.

The motor-integrated hub 10 is provided with a control circuit for drivably controlling the main motor body 10a. The control circuit has a function of a DC-AC inverter for performing switching on a DC current supplied from the power-storing part 14 and converting the DC current into an AC current. The control circuit has an assist function for driving the main motor body 10a as a motor for assisting human-powered driving; a regenerative braking function for driving the main motor body 10a so that regenerative braking is performed; a dynamo function for causing the main motor body 10a to be actuated as a generating part; and a power-off function for switching off the power supply for control.

In the assist function, the control circuit drivably controls the main motor body 10a, thereby assisting human-powered driving. In the regenerative braking function, the control circuit varies the ratio of regenerative braking in the main motor body 10a according to a control performed by the overall control part 12, thereby performing regenerative braking. In the dynamo function, the control circuit uses the main motor body 10a as a generator and supplies the electrical bicycle components 20 with electrical power capable of operating the electrical bicycle components 20. In the power-off function, the control circuit disables the assist function, the regenerative braking function, and the dynamo function; and stops these functions.

The handle part 104 has a handle stem 114 secured to an upper part of the front fork 103, and a bar-handle-shaped handlebar 115 secured to the handle stem 114. A display unit 18 and the headlamp 23 are mounted on a center part of the handlebar 115. The display unit 18 is proved for displaying the operation mode, such as the assist mode or the regenerative braking mode, A right brake lever 16f and a left brake lever 16r are mounted on either end of the handlebar 115. Each of the brake levers 16r and 16f includes an attachment bracket (not shown) detachably mounted on the handlebar 115, and a lever member 40 swingably mounted on the attachment bracket.

A brake sensor 53 is mounted on an interior of the attachment bracket as shown in FIG. 2. The brake sensor 53 detects the swing position of the lever member 40. The overall control part 12 performs regenerative braking control according to the swing position when the brake regeneration mode or the regular regeneration mode is enabled. A mode selection switch 44c is provided for selecting the various operation modes. A power switch 44e is provided for switching the power of the overall control part 12 on or off. A shift-up switch 43a is provided for shifting the rear derailleur to a higher-speed shift stage. A shift-down switch 43b is provided for shifting the rear derailleur to a lower-speed shift stage. A lamp switch 44a is provided for turning on and off the headlamp 23 and the tail light 24. A display changeover switch 44b is provided for switching the display between an assist screen and a cycle computer screen. Theses switches 43a, 43b, 44a, 44b, 44c and 44e are mounted on the attachment bracket.

A hanger unit 122a is provided to the hanger part 130. The hanger unit 122a has a torque sensor 17 for detecting pedaling force acting on the crank shaft 116, and a rotation sensor 19 for detecting the rotation angle of the crank shaft 116. The torque sensor 17 is used to detect pedaling force used in assist control. The rotation sensor 19 detects the state of rotation of the crank. The rotation sensor 19 is used so that, for example, assist operation is only performed in a circumstance in which the crank shaft 116 is rotating in a forward-pedaling direction (i.e., the direction in which the crank shaft is rotating in the direction of forward travel).

FIG. 2 shows the state of connection of each of the electrical bicycle components 20 described above. The electrical bicycle components 20 include, for example, the motor-integrated hub 10, the hanger unit 122a, the rear derailleur 108r, the headlamp 23, the display device or unit 18, the left brake lever 16r and the right brake lever 16f. Each of the electrical bicycle components 20 has a component control part 79 for performing a variety of controls in each of the electrical bicycle components 20, and a communication part 78 for the electrical bicycle components, as shown in FIG. 3. Each of the electrical bicycle components 20 is connected to the others by a power line 70. Electrical power from a power source is provided and signals are communicated using, e.g., PLC (power line communication). Provision of the power source and communication of signals are controlled by the communication part 78 for each of the electrical bicycle components.

FIG. 3 shows a function block diagram of an electrical component control system. The electrical component control system is a system for controlling the electrical bicycle components 20. The electrical component control system mainly includes the memory part 31, the overall communication part 30, the overall control part 12, the communication part 78 for the electrical component, the component control part 79, and an operation mode switching part 80.

The memory part 31 stores a variety of information used in the present system. The memory part 31 has an operation state memory part 76 and an operation configuration memory part 77. The operation state memory part 76 records the state of operation of each of the electrical bicycle components 20. For example, the operation state memory part 76 records a current state of operation of each of the electrical bicycle components 20 identified by an operation state confirming part 72 described further below.

Figure 4:
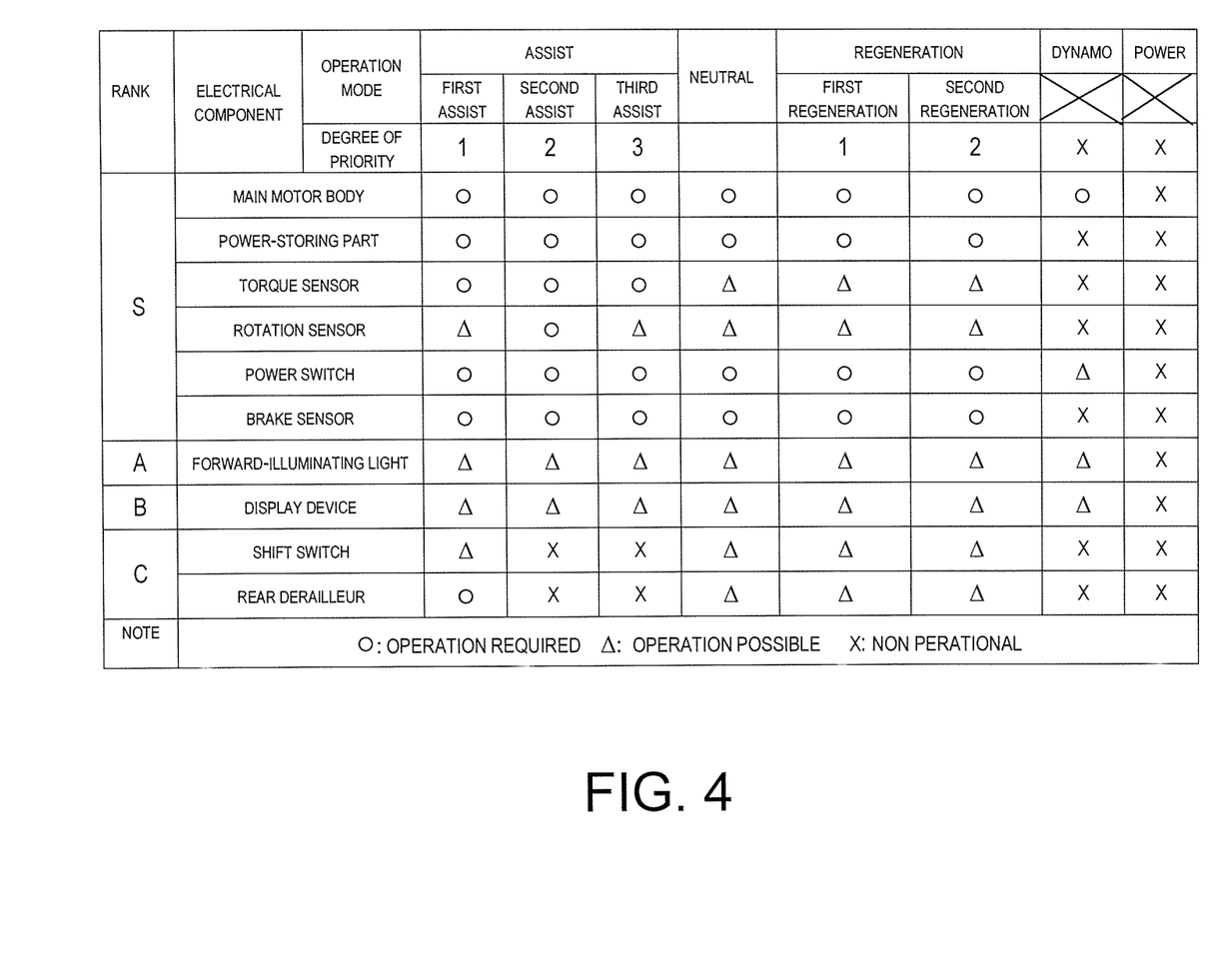
FIG. 4 is an operation table defining a preset operating configuration of electrical components.

The operation configuration memory part 77 records a plurality of preset operating configurations (see FIG. 4) for the electrical bicycle components 20 that corresponds with each of a plurality of operation modes. As shown in FIG. 4, the configuration of operation of the electrical bicycle components 20 is categorized into an "operation required" state (indicated by a circle), in which the electrical component 20 is required to operate; a "non-operational" state" (indicated by a cross), in which the electrical component 20 is not required to operate; and an "operation possible" state (indicated by a triangle), in which it is required that the electrical component 20 be capable of operating. In the "operation possible" state, it is required that the electrical component 20 be merely capable of operating; the electrical component 20 may be operating or may not be operating.

Also, each of the electrical bicycle components 20 is set with a rank showing the degree of importance of each of the electrical bicycle components 20 in each of the operation modes. The preset operating configuration of each of the above electrical components 20 is set according to this rank. FIG. 4 shows an example of a preset operating configuration for each of the electrical bicycle components 20 that corresponding to each of the operation modes (i.e., an operation table). This operation table can be amended as appropriate. Thus, the preset operating configurations can be changed from time to time as needed and/or desired.

As shown in FIG. 4, the operation mode includes an assist mode, a regeneration mode, a neutral mode, a dynamo mode, and a power-off mode. The assist mode includes a first assist method, a second assist method, and a third assist method. Between first, second and third assist methods, the operation of the motor for assisting human-powered driving differs. For example, in the first assist method, assisting is performed according to the shift stage. In the second assist method, assisting is performed according to the result of detection by the rotation sensor. In the third assist method, assisting is performed according only to the result of detection by the torque sensor.

The first, second and third assist methods are set with a predetermined sequence according to which the operation mode is switched, e.g., a switching sequence showing the level of priority when the operation mode is being switched. Here, each of the assist modes is switched in the sequence of first, second and third assist methods.

The regeneration mode includes a first regeneration method and a second regeneration method. In the first regeneration method, regenerative braking by the motor-integrated hub 10 is performed during rotation of the motor-integrated hub 10, and in a circumstance in which the brake is moved in a swinging motion, regenerative braking is changed according to the amount by which the brake has been swung. In the second regeneration method, regenerative braking by the motor-integrated hub 10 is continuously performed during rotation of the motor-integrated hub 10. In the second regeneration method, regenerative braking is not performed according to the amount by which the brake has been swung. The first regeneration method and the second regeneration method are set with a predetermined sequence according to which the operation mode is switched, e.g., a switching sequence showing the level of priority when the operation mode is being switched. Here, each of the regeneration modes is switched in the sequence of the first regeneration method and the second regeneration method.

In the neutral mode, regenerative braking by the motor-integrated hub 10 is not performed during rotation of the motor-integrated hub 10. Also, in the neutral mode, regenerative braking is performed in which in a circumstance in which a brake member is moved in a swinging motion, the regenerative braking varies according to the swinging motion of the brake member. In the dynamo mode, the main motor body 10a (generating part) arranged within the motor-integrated hub 10 is used as a generator, and electrical power capable of operating the electrical bicycle components 20 is supplied to the electrical bicycle components 20. In the power-off mode, supply of electrical power to all electrical components 20 is stopped. As a result, in the power-off mode, both of the assist function and the dynamo function are non-functional, and assume a switched-off state.

The overall communication part 30 performs communication with each of the electrical bicycle components 20. The overall communication part 30 performs power line communication with the electrical bicycle components 20. The overall communication part 30 transmits signals to each of the electrical bicycle components 20, and receives signals from each of the electrical bicycle components 20. The overall communication part 30 transmits a signal for changing the operation mode to the motor-integrated hub 10. Supply of electrical power and transmission of signals are performed simultaneously using, e.g., PLC, as described above.

The overall control part 12 issues a variety of commands to the electrical bicycle components 20 for the entire bicycle, and controls the electrical bicycle components 20 for the entire bicycle. The overall control part 12 also determines the state of operation of the electrical bicycle components 20 based on the result of communication by the overall communication part 30. The overall control part 12 then selects an operation mode from a plurality of operation modes, based on the state of operation of the plurality of electrical components 20.

Specifically, the overall control part 12 performs a comparison between the configuration of operation of the electrical bicycle components 20 operating in each of the operation modes and the operating state of the electrical bicycle components 20 shown in FIG. 4. Then the overall control part 12 selects the operation mode from the operation modes that operates according to the configuration of operation of the electrical bicycle components 20 that corresponds with the state of operation of the electrical bicycle components 20. In a circumstance in which there exists a switching sequence showing the level of priority when the operation mode is being switched, the overall control part 12 switches and selects an operation mode based on this switching sequence. The overall control part 12 then controls the electrical component 20 that operates in the selected operation mode. More specifically, the overall control part 12 includes an operation mode determining part 71, an operation state confirming part 72, an operation mode selecting part 74 and a power supply disabling part 75.

The operation mode determining part 71 determines the operation mode of the bicycle. For example, the operation mode determining part 71 determines the operation mode that has been set by the rider.

The operation state confirming part 72 confirms the state of operation of each of the electrical bicycle components 20 based on the result of communication by the overall communication part 30. Specifically, in a circumstance in which a signal for confirming the state of operation of an electrical component 20 is transmitted from the overall communication part 30 to the electrical component 20, and the signal received from the electrical component 20 by the overall communication part 30 is a signal for indicating that the electrical component 20 is operating, the operation state confirming part 72 determines that this electrical component 20 is being actuated. In a circumstance in which a signal for confirming the state of operation of an electrical component 20 is transmitted from the overall communication part 30 to the electrical component 20, and the signal received from the electrical component 20 by the overall communication part 30 is a signal for indicating that the electrical component 20 is not operating, or no signal is received from the electrical component 20, the operation state confirming part 72 determines that this electrical component 20 is not operating. With regard to the initial conditions immediately after the electrical component control system is activated, the operation state confirming part 72 determines the state of operation of each of the electrical bicycle components 20 to be unknown.

In the present embodiment, the electrical bicycle components 20 whose respective state of operation is to be confirmed are the electrical bicycle components shown in FIG. 4. The overall control part 12 transmits a signal for confirming the state of operation to these electrical components 20, and confirms the state of operation of the electrical bicycle components 20 according to the result of the communication.

The operation mode selecting part 74 selects an operation mode from a plurality of operation modes according to the state of operation of the electrical bicycle components 20. For example, in a circumstance in which the state of operation of at least one of the electrical bicycle components 20 does not correspond with the corresponding configuration of operation of the electrical bicycle components 20, an operation mode that can operate in the state of operation confirmed by the operation state confirming part 72 is selected.

Specifically, in a circumstance in which the state of operation of at least one of the electrical bicycle components 20 does not correspond with the corresponding configuration of operation of the electrical bicycle components 20, the operation mode selecting part 74 changes the operation mode in operation to an operation mode that can operate in the state of operation confirmed by the operation state confirming part 72 (i.e., a response operation mode). In a circumstance in which the state of operation of all of the electrical bicycle components 20 corresponds with the corresponding configuration of operation of the electrical bicycle components 20, the current operation mode is maintained.

More specifically, in a circumstance in which the state of operation of at least one of the electrical bicycle components 20 does not correspond with the corresponding configuration of operation of the electrical bicycle components 20, the operation mode selecting part 74 searches, from among the plurality of operation modes, for an operation mode having a preset operating configuration that corresponds with the state of operation of all of the electrical bicycle components 20. The operation mode selecting part 74 then acknowledges the searched-for operation mode as the response operation mode.

In a circumstance in which the operation modes have been set with a switching sequence, the operation mode selecting part 74 searches, from among the operation modes, for an operation mode having a preset operating configuration that corresponds with the state of operation of all of the electrical bicycle components 20, based on the switching sequence.

For example, in a circumstance in which the operation mode determined by the operation mode determining part 71 is the assist mode or the regeneration mode, the operation mode selecting part 74 searches, from among each of the operation modes, for an operation mode having a preset operating configuration that corresponds with the state of operation of all of the electrical bicycle components 20, based on the switching sequence set to each of the operation modes. In a circumstance in which an operation mode having a preset operating configuration that corresponds with the state of operation of all of the electrical bicycle components 20 is not detected, the operation mode selecting part 74 determines whether or not the neutral mode will be the response operation mode. Then, in a circumstance in which the state of operation of the electrical bicycle components 20 does not correspond with the configuration of operation of the neutral mode, the operation state confirming part 72 determines whether or not the dynamo mode will be the response operation mode. Then, in a circumstance in which the state of operation of the electrical component 20 does not correspond with the configuration of operation of the dynamo mode, the operation state confirming part 72 determines the power-off mode to be the response operation mode.

The power supply disabling part 75 stops supply of electrical power to the main motor body 10a under a preset operating configuration that requires the main motor body 10a to be stopped, and stops supply of electrical power to all of the electrical bicycle components 20 under a preset operating configuration that requires all of the electrical bicycle components 20 to be stopped.

The component control part 79 performs a variety of controls in an electrical component 20. For example, upon receiving a command with respect to the electrical component 20 from the overall control part 12, the component control part 79 acknowledges this command, and performs the processing that corresponds with this command. More specifically, when the communication part 78 for the electrical component receives a signal from the overall communication part 30, the component control part 79 performs the processing that corresponds with this signal. Then, the component control part 79 instructs the communication part 78 for the electrical component to transmit the result of this process to the overall control part 12.

The communication part 78 for the electrical component performs communication with the overall control part 12. Upon receiving a signal from the overall control part 12, the communication part 78 for the electrical component transmits a signal in correspondence with this signal to the overall control part 12. Transmission/reception of this signal is performed using power line communication. Supply of electrical power and transmission of signals are performed simultaneously using, e.g., PLC, as described above.

The operation mode switching part 80 switches the operation mode of the motor-integrated hub 10. For example, when the overall control part issues a signal to the motor-integrated hub 10 to indicate changing the operation mode, the operation mode switching part 80 switches the operation mode of the motor-integrated hub 10 to the operation mode indicated by this signal (i.e., the response operation mode).

Figure 5:
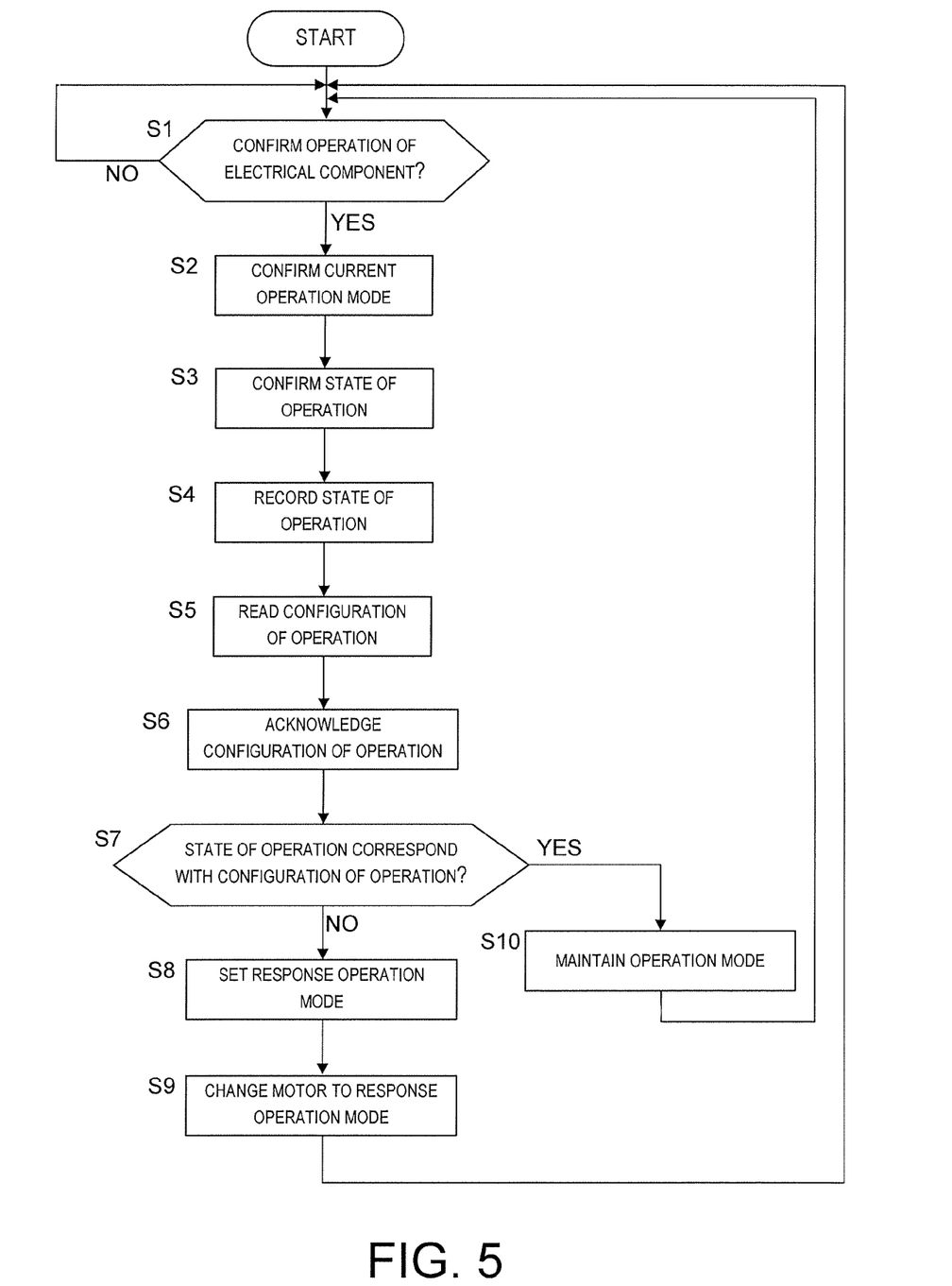
FIG. 5 is a flow chart showing a control operation executed by the electrical component control system.

FIG. 5 shows a flow chart showing a control operation executed by the electrical component control system. The electrical component control system is a system for managing and controlling the electrical bicycle components 20. An example of operation of the electrical component control system is described below.

First, the overall control part 12 determines whether or not to confirm the state of operation of the electrical bicycle components 20, in a state in which the electrical component control system has been activated (step S1). Here, the state of operation of the electrical bicycle components 20 is confirmed in a circumstance in which a predetermined time has elapsed since the electrical component control system was activated, or a predetermined time has elapsed since the state of operation of the electrical bicycle components 20 was previously confirmed.

Next, in a circumstance in which the state of operation of the electrical bicycle components 20 is to be confirmed (i.e., "Yes" in step S1), the current operation mode of the bicycle, e.g., the operation mode that has been set by the rider, is determined by the overall control part 12 (step S2). Meanwhile, in a circumstance in which the predetermined time has not yet elapsed since the electrical component control system was activated, or a predetermined time has not yet elapsed since the state of operation of the electrical bicycle components 20 was previously confirmed (i.e., "No" in step S1), the control process stands by at step S1 until either of the above times has elapsed.

Next, the overall control part 12 confirms the state of operation of each of the electrical bicycle components 20 (step S3). Specifically, the overall control part 12 transmits an operation confirmation signal for confirming the state of operation of each of the electrical bicycle components 20 to each of the electrical component 20 via the overall communication part 30. The operation confirmation signal is then inputted into the respective communication part 78 for each of the electrical bicycle components, and the operation confirmation signal is acknowledged by the respective control part of each of the electrical bicycle components 20.

The current state of operation of the electrical component 20 is then examined by the control part of the electrical component 20. Here, for example, the control part of the electrical component 20 examines whether the current state of operation of the electrical component 20 is active (i.e., operating) or inactive (i.e., not in operation). A command to transmit a signal for notifying the overall control part 12 of the result of the examination, i.e., the state of operation of the electrical component 20 (i.e., an operation notification signal) is issued by the component control part 79 to the communication part 78 for the electrical component. Then, the signal indicating the state of operation of the electrical component 20, i.e., the operation notification signal, is transmitted by the communication part 78 for the electrical component to the overall communication part 30, and the operation notification signal is acknowledged by the overall control part 12.

Then, the overall control part 12 records, in the operation state memory part 76, the state of operation of each of the electrical bicycle components 20, based on the operation notification signal received from each of the electrical bicycle components 20 (step S4). Here, in a circumstance in which the state of operation of each of the electrical bicycle components 20 is already recorded in the operation state memory part 76, i.e., in a circumstance in which the previous state of operation of each of the electrical bicycle components 20 is recorded in the operation state memory part 76, the most recent state of operation of each of the electrical bicycle components 20 is recorded in the operation state memory part 76 to replace the previous state of operation of each of the electrical bicycle components 20. In other words, the latest state of operation of each of the electrical bicycle components 20 is recorded in the operation state memory part 76 as priority.

Next, the configuration of operation of the electrical bicycle components 20 shown in FIG. 4, i.e., the operation table, is read from the memory part 31, e.g., the operation configuration memory part 77 (step S5). The configuration of operation of the electrical bicycle components 20 that corresponds with the current operation mode in the operation table is acknowledged by the overall control part 12 (step S6). Specifically, in a circumstance in which the current operation mode is the neutral mode, the configuration of operation of the electrical bicycle components 20 that corresponds with the neutral mode in the operation table shown in FIG. 4, i.e., the configuration of operation of all of the electrical bicycle components 20 in the neutral mode in the operation table (i.e., "operation required", "operation possible", "non-operational") is acknowledged by the overall control part 12. In a circumstance in which the current operation mode is another operation mode, the configuration of operation of the electrical bicycle components in the operation table that corresponds with the current operation mode (i.e., "operation required", "operation possible", "non-operational") is similarly acknowledged by the overall control part 12. Here, the electrical bicycle components in the operation table correspond with the electrical bicycle components 20 shown in FIG. 4.

Next, the overall control part 12 determines whether or not the latest state of operation of the electrical bicycle components 20 and the configuration of operation of the electrical bicycle components 20 in the operation table that corresponds with the current operation mode correspond with each other (step S7). In a circumstance in which the state of operation of the electrical bicycle components 20 and the configuration of operation of the electrical bicycle components 20 correspond with each other (i.e., "Yes" in step S7), the current operation mode is maintained. Then, the processing in step S1 described above is performed again.

Meanwhile, in a circumstance in which the latest state of operation of the electrical bicycle components 20 and the configuration of operation of the electrical bicycle components 20 that corresponds with the current operation mode do not correspond with each other (i.e., "No" in step S7), the overall control part 12 performs a process of searching, from the operation table shown in FIG. 4, for a preset operating configuration of the electrical bicycle components 20 that corresponds with the latest state of operation of the electrical bicycle components 20. In a circumstance in which the overall control part 12 detects a preset operating configuration of the electrical bicycle components 20 that corresponds with the latest state of operation of the electrical bicycle components 20, the overall control part 12 sets the operation mode having this configuration of operation of the electrical bicycle components 20 as the response operation mode (step S8).

A more detailed description for setting the response operation mode will now be given. In a circumstance above in which the latest state of operation of the electrical bicycle components 20 and the configuration of operation of the electrical bicycle components 20 that corresponds with the current operation mode do not correspond with each other, first, the overall control part 12 determines whether or not the current operation mode is the assist mode. In a circumstance in which the current operation mode is the assist mode, the overall control part 12 searches, in the operation table, for an operation mode that corresponds with the latest state of operation of the electrical bicycle components 20, according to the switching sequence (i.e., degree of priority shown in FIG. 4) set to each of the assist modes, i.e., in the sequence of the first assist method, second assist method, and third assist method. In a circumstance in which there is an assist mode (i.e., first assist method, second assist method, third assist method) that corresponds with the latest state of operation of the electrical bicycle components 20, this operation mode is set as the response operation mode.

In a circumstance in which the latest state of operation of the electrical bicycle components 20 does not correspond with the configuration of operation of the electrical bicycle components 20 in the first assist method, the second assist method, or the third assist method, the overall control part 12 determines whether or not the latest state of operation of the electrical bicycle components 20 corresponds with the configuration of operation of the electrical bicycle components 20 in the neutral mode. In a circumstance in which the latest state of operation of the electrical bicycle components 20 corresponds with the configuration of operation of the electrical bicycle components 20 in the neutral mode, the neutral mode is set as the response operation mode.

In a circumstance in which the latest state of operation of the electrical bicycle components 20 does not correspond with the configuration of operation of the electrical bicycle components 20 in the neutral mode, the overall control part 12 determines whether or not the latest state of operation of the electrical bicycle components 20 corresponds with the configuration of operation of the electrical bicycle components 20 in the dynamo mode. In a circumstance in which the latest state of operation of the electrical bicycle components 20 corresponds with the configuration of operation of the electrical bicycle components 20 in the dynamo mode, the dynamo mode is set as the response operation mode. In a circumstance in which the latest state of operation of the electrical bicycle components 20 does not correspond with the configuration of operation of the electrical bicycle components 20 in the dynamo mode, the power-off mode is set as the response operation mode.

Thus, in the present embodiment, the operation mode that is the object of the search is switched in the sequence of assist mode (a first assist method, a second an assist mode, a third assist method), a neutral mode, a dynamo mode, and the power-off mode; and the response operation mode is set.

Next, in a circumstance in which the current operation mode is not the assist mode, the overall control part 12 determines whether or not the current operation mode is the regeneration mode. In a circumstance in which the current operation mode is the regeneration mode, the overall control part 12 searches, in the operation table, for an operation mode that corresponds with the latest state of operation of the electrical bicycle components 20, according to the switching sequence (i.e., degree of priority shown in FIG. 4) set to each of the regeneration modes, i.e., in the sequence of the first regeneration method and the second regeneration method. In a circumstance in which there is a regeneration mode (i.e., first regeneration method, second regeneration method) that corresponds with the latest state of operation of the electrical bicycle components 20, this operation mode is set as the response operation mode.

Meanwhile, in a circumstance in which the latest state of operation of the electrical bicycle components 20 does not correspond with the configuration of operation of the electrical bicycle components 20 in the first regeneration method or the second regeneration method, the overall control part 12 determines, as with the circumstance of the assist mode described above, whether or not the latest state of operation of the electrical bicycle components 20 corresponds with the configuration of operation of the electrical bicycle components 20 in each of the neutral mode and the dynamo mode, in the sequence of the neutral mode followed by the dynamo mode. In a circumstance in which the latest state of operation of the electrical bicycle components 20 corresponds with the configuration of operation of the electrical bicycle components 20 in the neutral mode or the dynamo mode, the operation mode having the corresponding configuration of operation of the electrical bicycle components 20 is set as the response operation mode. In a circumstance in which the latest state of operation of the electrical bicycle components 20 does not correspond with the configuration of operation of the electrical bicycle components 20 in the dynamo mode, the power-off mode is set as the response operation mode.

Thus, in the present embodiment, the operation mode to be searched is switched in the sequence of regeneration mode (first regeneration method, second regeneration method), neutral mode, dynamo mode, and the power-off mode; and the response operation mode is set.

In a circumstance in which the latest state of operation of an electrical component 20 is operational, if the configuration of operation of the electrical component 20 in the operation table that corresponds with the current operation mode is "operation required" (i.e., a circle), it is determined that the latest state of operation of the electrical component 20 and the configuration of operation of the electrical component 20 in the operation table that corresponds with the current operation mode correspond with each other. In a circumstance in which the latest state of operation of the electrical component 20 is non-operational, if the configuration of operation of the electrical component 20 in the operation table that corresponds with the current operation mode is "non-operational" (i.e., a cross), it is determined that the latest state of operation of the electrical component 20 and the configuration of operation of the electrical component 20 in the operation table that corresponds with the current operation mode correspond with each other.

In particular, in the operation table in FIG. 4, "operation possible" (i.e., a triangle) includes both circumstances in which the electrical component 20 is operational and circumstances in which the electrical component 20 is not operational. Therefore, if the configuration of operation of the electrical component 20 according to the operation table is "operation possible" (i.e., a triangle), it is determined that the state of operation of the electrical component 20 and the configuration of operation in the operation table correspond with each other, whether or not the state of operation of the electrical component 20 is operational or not operational.

When the response operation mode is set as described above, in a circumstance in which the response operation mode is the power-off mode, supply of electrical power to all of the electrical bicycle components 20 is stopped.

Next, the current operation mode of the motor-integrated hub 10 is changed to the above response operation mode (step S9). Specifically, a command for changing the current operation mode of the motor-integrated hub 10 to the response operation mode is issued by the overall control part 12 to the overall communication part 30. A mode changing signal for changing the operation mode to the response operation mode is then transmitted from the overall communication part 30 to the motor-integrated hub 10. The operation mode of the motor-integrated hub 10 is then changed to the response operation mode based on this mode changing signal. Then, when the operation mode of the motor-integrated hub 10 is changed to the response operation mode, the processing in step S1 described above is performed again.

In a circumstance in which the overall control part 12 is stopped, the electrical component control system is also stopped. In other words, although an end is not displayed in the control process shown in FIG. 5, the control process shown in FIG. 5 ends in a circumstance in which the overall control part 12 stops.

Last, a more detailed description will now be given with regards to determining whether or not the state of operation of the electrical bicycle components 20 corresponds with the configuration of operation of the electrical bicycle components 20 in the operation table.

In step S4 described above, the configuration of operation of each of the electrical bicycle components 20 is recorded in the operation state memory part 76. For example, state data DJ (m1, n) showing the state of operation of an electrical component 20 is defined by a variable m1 for the current operation mode and a variable n for identifying each of the electrical bicycle components 20, and this state data DJ (m1, n) is recorded in the operation state memory part 76.

With regards to the variables m1, n, an individual value (i.e., a predetermined value) is allocated to each of the electrical bicycle components 20. For example, m1 is set to 1 for the first assist method, 2 for the second assist method, and 3 for the third assist method. The variable m1 for the neutral mode, the first regeneration method, the second regeneration method, the dynamo mode, and the power-off mode is respectively set to a natural number from 4 to 8. In other words, m1 is set to 4 for the neutral mode, 5 for the first regeneration method, 6 for the second regeneration method, 7 for the dynamo mode, and 8 for the power-off mode.

The variable n is set to a natural number from 1 to 10. For example, in the operation table shown in FIG. 4, ten electrical components 20 are shown, arranged in the vertical direction. The variable n corresponding to each of the electrical bicycle components 20 in the operation table is sequentially set to a natural number from 1 to 10 from the top to the bottom of the operation table.

If the state of operation of the electrical component 20 is operational, the state data DJ (m1, n) described above is allocated, e.g., a value of "1" and this state data DJ (m1, n) is recorded in the operation state memory part 76. Also, if the state of operation of the electrical component 20 is non-operational, the state data DJ (m1, n) is allocated, e.g., a value of "2" and this state data DJ (m1, n) is recorded in the operation state memory part 76.

Next, in the above steps S5 and S6, data, e.g., of the following description, is read from the operation configuration memory part 77, whereby the configuration of operation of each of the electrical bicycle components 20 is acknowledged by the overall control part 12. In other words, data of the following description is recorded in the operation configuration memory part 77. Specifically, the configuration of operation of each of the electrical bicycle components 20 in the operation table is defined using, e.g., configuration data DK (m2, n). The initial setting of the variable m2 used here is the same as the setting of the variable m1 described above. The variable n is identical to the variable n described above.

When the operation mode that is the object of the search in the operation table is changed between step S7 and step S8, the variable m2 also varies in accordance with the change in the operation mode. For example, when the object of the search changes in the sequence of the first assist method, the second assist method, the third assist method, the neutral mode, the dynamo mode, and the power-off mode, the variable m2 varies in the sequence of 1, 2, 3, 4, 7, and 8. Also, when the object of the search changes in the sequence of the first regeneration method, second regeneration method, the neutral mode, the dynamo mode, and the power-off mode, the variable m2 varies in the sequence of 5, 6, 4, 7, 8.

In a circumstance in which the configuration of operation in the operation table is "operation required", the configuration data DK (m2, n) described above is allocated, e.g., a value of "1" in advance, and this configuration data DK (m2, n) is recorded in the operation configuration memory part 77. In a circumstance in which the configuration of operation in the operation table is "non-operational", the configuration data DK (m2, n) described above is allocated, e.g., a value of "2" in advance, and this configuration data DK (m2, n) is recorded in the operation configuration memory part 77. Also, in a circumstance in which the configuration of operation in the operation table is "operation possible", the configuration data DK (m2, n) described above is allocated, e.g., a "3" in advance, and this configuration data DK (m2, n) is recorded in the operation configuration memory part 77.

The state data DJ (m1, n) and the configuration data DK (m2, n) having equivalent values for variable n are compared by setting the state data DJ (m1, n) and the configuration data DK (m2, n) as described above, whereby the overall control part 12 is able to determine whether or not the state of operation of each of the electrical bicycle components 20 corresponds with the configuration of operation of each of the electrical bicycle components 20 in the operation table.

For example, in a circumstance in which the value of the state data DJ (m1, n) and the value of the configuration data DK (m2, n) match, and in a circumstance in which the value of the state data DJ (m1, n) and the value of the configuration data DK (m2, n) do not match and the value of the configuration data DK (m2, n) is "3", the overall control part 12 determines that the state of operation of each of the electrical bicycle components 20 corresponds with the configuration of operation of each of the electrical bicycle components 20 in the operation table. In other circumstances, the overall control part 12 determines that the state of operation of each of the electrical bicycle components 20 does not correspond with the configuration of operation of each of the electrical bicycle components 20 in the operation table. Thus, the overall control part 12 is able to determine whether the state of operation of each of the electrical bicycle components 20 and the configuration of operation of each of the electrical bicycle components 20 in the operation table correspond with each other or do not correspond with each other.

As described above, in the present embodiment, the overall communication part 30 performs communication with each of the electrical bicycle components 20, thereby making it possible for the overall control part 12 to determine, based on the result of the communication, the state of operation of the electrical bicycle components. For example, the overall communication part 30 is able to determine the state of operation of each of the electrical bicycle components 20 from whether or not communication is occurring between the overall communication part 30 and the communication part 78 for each of the electrical bicycle components. Also, the overall control part 12 is able to select, based on the state of operation of each of the electrical bicycle components 20, an operation mode in which travel is possible in a state in which the electrical bicycle components 20 are operating in an appropriate manner, from three or more operation modes. It is thus possible to control the electrical bicycle components according to the state of operation of the electrical bicycle components.

Although an embodiment of the present invention has been described above, the present invention is not limited in scope thereby; a variety of modifications being possible without departing from the scope of the invention.

(a) Although the rear derailleur 108r is electrically driven in the above embodiment, a configuration is also possible in which the rear derailleur 108r is connected to a shift lever by a wire, and shift driving is performed on the rear derailleur 108r by pulling the wire using the shift lever. Also, although the power-assisted bicycle is configured so as to have an external shifting device in the above embodiment, the power-assisted bicycle may also be configured so as to have an internal shifting device, or to have no shifting device. The present system can be applied to all types of power-assisted bicycles.

(b) Although in the above embodiment, the configuration of operation is read after the state of operation has been confirmed as shown in FIG. 5, the state of operation may be confirmed after the configuration of operation has been read. Alternatively, the state of operation may be confirmed in parallel with the configuration of operation being read.

Thus, the foregoing descriptions of the embodiments according of bicycle regenerative brake control device are provided for illustration only, and not for the purpose of limiting the invention as defined by the appended claims and their equivalents.

What is claimed is:

1. A bicycle electrical component control system for controlling a plurality of electrical bicycle components that can be installed on an electric bicycle in which human-powered driving is assisted by a motor, the bicycle electrical component control system comprising:

a control part being programmed to perform a comparison between an operating state of each of the electrical bicycle components and a plurality of preset operating configurations of the electrical bicycle components in each of at least three operation modes, the operating state being determined by the control part as either an active operating state or an inactive operating state, the preset operating configurations including at least a configuration in which operation is required and a configuration in which operation is not required, the control part being programmed to select a current operation mode from the at least three operation modes based on a result of the comparison, and the control part being programmed to output a command to control the electrical bicycle components in accordance with the current operation mode that was selected.

2. The bicycle electrical component control system according to claim 1, further comprising a communication part that performs communication with each of the electrical bicycle components, and the control part determining the operating states of the electrical bicycle components being in one of the active operating state and the inactive operating state based on a result of communication by the communication part.

3. The bicycle electrical component control system according to claim 2, wherein the control part selects the current operation mode from the at least three operation modes that operates based on which one of the preset operating configurations of the electrical bicycle components most closely matches the operating states of the electrical bicycle components.

4. The bicycle electrical component control system according to claim 3, wherein the preset operating configurations of the electrical bicycle components is set according to a degree of importance of each of the electrical bicycle components in each of the at least three operation modes.

5. The bicycle electrical component control system according to claim 4, wherein the at least three operation modes include a plurality of assist modes between which operation of the motor for assisting human-powered driving differs.

6. The bicycle electrical component control system according to claim 5, wherein the control part switches and selects the current operation mode based on a predetermined sequence.

7. The bicycle electrical component control system according to claim 1, wherein the control part selects the current operation mode from the at least three operation modes that operates based on which one of the preset operating configurations of the electrical bicycle components most closely matches the operating states of the electrical bicycle components.

8. The bicycle electrical component control system according to claim 7, wherein the preset operating configurations of the electrical bicycle components are set according to a degree of importance of each of the electrical bicycle components in each of the at least three operation modes.

9. The bicycle electrical component control system according to claim 1, wherein the at least three operation modes include a plurality of assist modes between which operation of the motor for assisting human-powered driving differs.

10. The bicycle electrical component control system according to claim 1, wherein the control part switches and selects the current operation mode based on a predetermined sequence.

* * * * *